Aug. 18, 1953

D. H. PUTNEY 2,649,486

PROCESS FOR PREPARING OLEFINIC HYDROCARBONS
AND RECYCLE ACID CATALYST FOR ABSORPTION
PRIOR TO ALKYLATION

Filed Nov. 17, 1950

INVENTOR.
David H. Putney
BY
ATTORNEY.

INVENTOR.
David H. Putney

Patented Aug. 18, 1953

2,649,486

UNITED STATES PATENT OFFICE 2,649,486

PROCESS FOR PREPARING OLEFINIC HYDROCARBONS AND RECYCLE ACID CATALYST FOR ABSORPTION PRIOR TO ALKYLATION

David H. Putney, Kansas City, Mo., assignor to Stratford Engineering Corporation, Kansas City, Mo., a corporation of Delaware Application November 17, 1950, Serial No. 196,282

4 Claims. (Cl. 260—683.4)

This invention relates to improvements in the alkylation of hydrocarbons in the presence of a liquid catalyst and refers more particularly to an alkylation process utilizing an absorption step where the olefinic hydrocarbons to be alkylated are preliminarily absorbed in the recycle acid, the novelty in the process residing primarily in the removal or extraction of the isoparaffins which exist and accumulate in the recycle acid and the preserving of these isoparaffins for reuse.

Many processes have been proposed for the two stage alkylation of hydrocarbons, the first stage comprising the absorption of olefinic hydrocarbons in the acid recycled from the second stage, the second stage constituting the stage of alkylation where the acid-olefin mixture is contacted with the isoparaffins. Although many processes of this type have been attempted on bench and pilot plant scale, to date none has been applied on a commercial scale because of serious economic disadvantages. Some of the most common faults of such processes are:

(a) Low yield of rerun alkylate.
(b) Low octane number of alkylate.
(c) High acid consumption.
(d) Loss of valuable isoparaffins from the absorber.

Faults (a) and (c) usually occur together but fault (d) is a function chiefly of the quantity of isoparaffin existing in the recycle acid which is used as the absorbent. The process described in applicant's Patent 2,281,248 discloses certain combinations of acid-olefin ratio and residence time in the absorber to make both a high yield and a high quality of alkylate with relatively low acid consumption. In the operation of that process on pilot plant scale, however, it was found that isobutane losses were high, both in the case of liquid phase and vapor phase absorption.

Tests of recycle sulphuric acid drawn from the bottom of alkylation settlers show hydrocarbon contents varying from 2% to 12% by volume. This hydrocarbon is largely isobutane because of the high percentage of isobutane in the total hydrocarbons with which the settled acid is in equilibrium. When this acid containing hydrocarbon is passed to a liquid phase absorber to meet a feed stock consisting principally of olefins and normal paraffins, the olefins are absorbed in the acid if proper operating conditions are maintained. However, the hydrocarbon equilibrium established in the mixture results in a large portion of the isoparaffins which entered with the acid going into solution in the normal paraffin. When separation of the mixture into a hydrocarbon phase and an acid phase is made this isoparaffin leaves with the normal hydrocarbon and is lost to the alkylation step. The purpose of such an absorber is to capture the olefins for alkylation and separate the normal paraffins for discard from the system. It is the loss of valuable isoparaffins with the discarded normal paraffins which has heretofore been overlooked. True, they could again be recovered from the normal paraffins by fractionation but this is an expensive procedure and unnecessary in the light of applicant's present invention.

Some proposed absorption-alkylation processes include absorbers operated in the vapor phase, that is, the mixture of normal paraffins and olefins enters the absorption step as a vapor, is contacted with the acid which absorbs the olefins, and the normal paraffins leave the absorption step as vapor to discard or to further processing. When the acid to the absorber contains isobutane, a substantial part of this isobutane is vaporized by the stripping action of the normal paraffins and is carried out with them. When utilizing high acid: olefin ratios in the absorber as required for best operation whether the absorption step be operated in liquid or vapor phase this loss of isobutane with the normal paraffins discarded from the absorber frequently equals or exceeds the amount of alkylate produced by methods heretofore proposed for absorption-alkylation processes.

Applicant has now discovered a process for preventing these isobutane losses and one which simultaneously reduces the acid consumption while improving both the yield and quality of the product.

A primary object of the invention, therefore, is to provide a means for chilling recycle alkylation acid and stripping it of isobutane so it is suitable for use in an olefin absorption step without appreciable isobutane loss.

Another object is to provide an alkylation process with preabsorption of olefins wherein the acid consumption is low.

A further object is to provide a process which will give improved quality and yield of rerun end point alkylate.

Other and further objects of the invention will appear from the description which follows.

In the accompanying drawings which form a part of the specification and are to be read in conjunction therewith, there is shown in the form of a flow diagram apparatus in which the invention may be practiced and in the different figures like reference numerals are used to indicate like parts.

Figure 1:
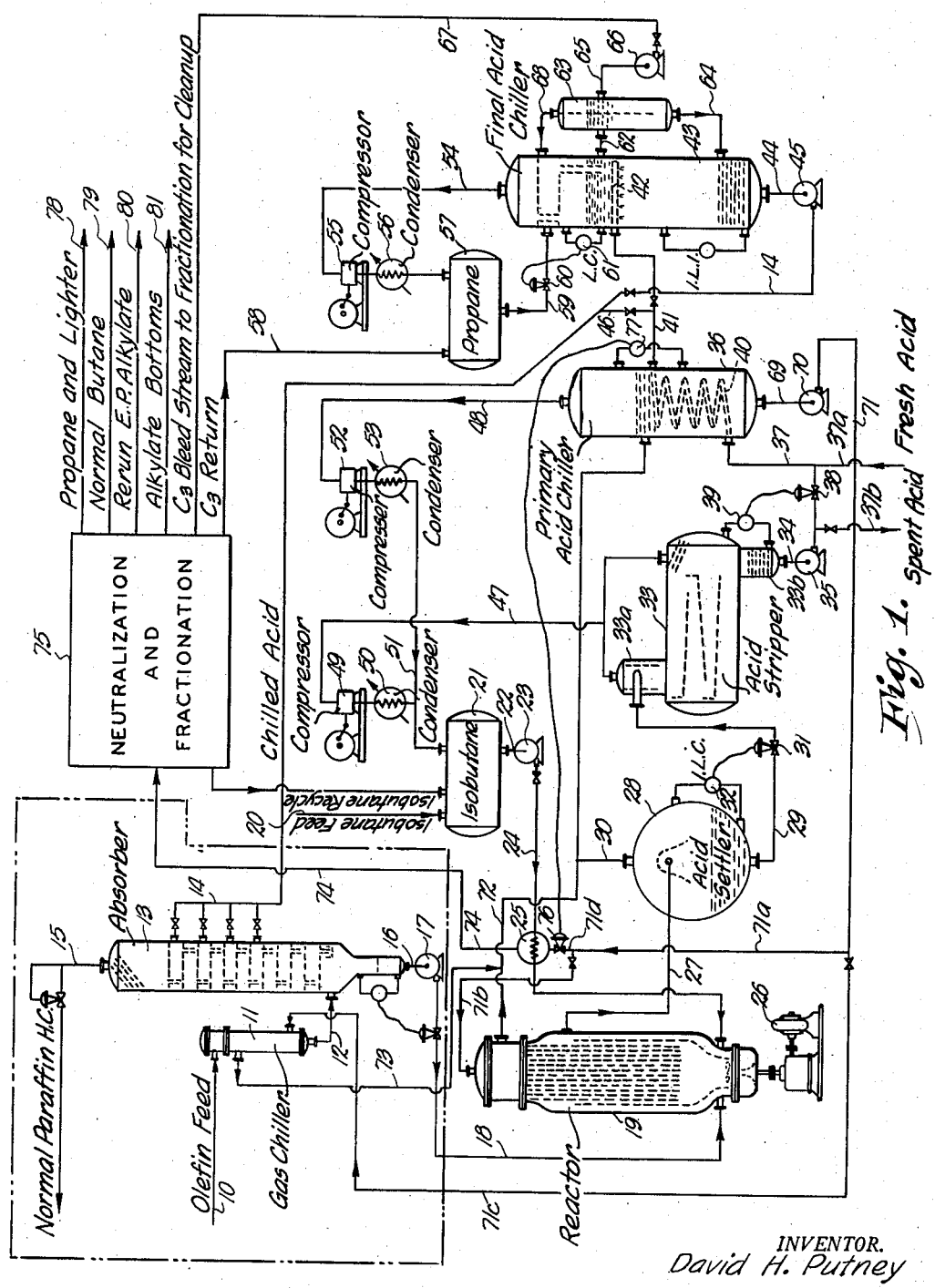
Fig. 1 is a flow diagram of an apparatus in which the invention may be practiced.

Referring to Fig. 1 of the drawings the olefin feed stock is introduced through pipe 10 and after passing through heat exchanger 11 it is directed through pipe 12 to the absorption tower 13. In the absorber it is brought in counter-flow contact with recycle chilled acid introduced through pipe 14 and branch pipes which charge the recycle acid at different levels to the tower. The unabsorbed normal paraffinic hydrocarbons pass off from the top of the tower through pipe 15 while the recycle acid-olefin mixture is withdrawn from the bottom of the tower through pipe 16 and is charged by pump 17 through line 18 into the bottom of reactor 19. Isobutane is fed to the system through pipe 20 into the isobutane accumulator tank 21. From this tank isobutanes are withdrawn through pipe 22 and charged by pump 23 through line 24 into the bottom of the reactor. Interposed in pipe 24 is heat exchanger 25. In contactor 19 the olefin absorbed in the acid is brought in intimate contact with the isobutane supplied through pipe 24 resulting in the conventional alkylation reaction. Circulation of fluids in the alkylation step during the contacting period is effected by a propeller positioned in the bottom of the reactor and driven by any suitable source of power such as the turbine shown at 26. Although a refrigerated reactor utilizing a propeller and open ended circulating tube is shown any of the well-known types of reactors may be employed. Normally, it should be unnecessary to do any cooling in the reactor if acid : olefin ratio and chilled acid temperatures are such that the heat balance provides satisfactory temperatures in the reactor, but cooling has been shown should the necessity therefor arise. The liquid effluent from the reactor is discharged through pipe 27 and passed to the acid settler 28 from which the acid phase is withdrawn through pipe 29 and the hydrocarbon phase through pipe 30. The pressure on the acid containing absorbed hydrocarbons is reduced at valve 31 regulated by liquid level control device 32, after which it is discharged into the dome 33a of acid stripper 33. The stripped acid accumulating in leg 33b of the acid stripper is discharged through pipe 34 and is directed by pump 35 to the primary acid chiller 36 through line 37. Connected into line 37 is a fresh acid supply pipe 37a and a spent acid withdrawal pipe 37b. Interposed in pipe 37 is a control valve 38 operated by a level control device 39. In acid chiller 36 the stripped acid is passed through a closed coil 40 located in the liquid portion of the chiller. The discharge end of coil 40 is connected by pipe 41 with a perforated spray 42 located centrally in the final acid chiller 43. In this upright tank or tower which constitutes the final acid chiller, the stripped acid accumulates in the bottom and is withdrawn through pipe 44.

This withdrawn stripped acid chilled to a relatively low temperature is directed by means of pump 45 through pipe 14 back to the absorber 13. A bypass line 46 suitably valved is interposed between lines 41 and 14. From the upper part of the acid stripper, both from the dome 33a and tank 33, is withdrawn hydrocarbon vapors through pipe 47. The dome 33a is constructed with tangential inlet and central vapor core similar to a typical cyclone type separator. Here an initial separation is made of acid and the hydrocarbons which are vaporized by the reduction of pressure in passing through valve 31. Additional vapors are evolved later as the acid slowly runs down over a series of vaporizing pans shown as dotted lines in the stripper. In a like manner hydrocarbons in vapor phase are withdrawn from the top of the primary chiller 36 through pipe 48. Thus hydrocarbons taken from the acid stripper are compressed at 49 and after being cooled and liquified in condenser 50 they are directed through line 51 to the isobutane accumulator 21. Hydrocarbons withdrawn through pipe 48 are compressed at 52, passed through condenser 53 and likewise directed through pipe 51 to isobutane accumulator 21. Hydrocarbons withdrawn from the top of the final chiller 43 are passed through pipe 54, compressed at 55, cooled in condenser 56, and accumulated in propane tank 57. Liquid propane is also supplied to accumulator 57 through pipe 58 from fractionation diagrammatically indicated as a rectangular block 75 in the upper portion of Fig. 1 and generally designated by the phrase neutralization and fractionation. Liquid propane used for autorefrigeration in the final acid chiller 43 is supplied from accumulator 57 through pipe 59 in which is interposed valve 60 regulated by level control device 61. In the chiller the acid is divided into small droplets by the spray pipe 42 and because of its high specific weight falls downward through the cold propane and is chilled thereby to within a few degrees of the propane temperature. To remove acid suspended in the hydrocarbon liquid, some of the hydrocarbon is withdrawn through pipe 62 and accumulated in a separate liquid body in separator 63. The heavier portion containing acid is returned to vessel 43 through pipe 64 while the remaining liquid is discharged through pipe 65 to be directed by pump 66 through line 67 back to fractionation for cleanup. Cleanup of the refrigerant hydrocarbon is required because small quantities of alkylate which do not vaporize from the acid in the stripper go into solution in the refrigerant in the secondary chiller. The top of separator 63 is vented back to vessel 43 by pipe 68. Liquid hydrocarbon from the primary chiller 36 is withdrawn through pipe 69 and returned by pump 70 and pipe 71 to be used as a cooling medium for the olefin feed in gas chiller 11 and for the alkylation reaction in reactor 19. This cooling medium used in the reactor heat exchanger elements flows through pipes 71, 71a and 71b. That portion used as a cooling medium for the olefin feed passes through pipes 71 and 71c. Discharge of the cooling medium from the reactor is through pipe 72 which discharges back into the primary chiller 36. Discharge of the cooling medium from gas chiller 11 is through pipe 73 which joins pipe 72 and discharges its fluid with that from the reactor back into the primary chiller. A portion of the cooling medium diverted through pipe 71a is directed through pipe 71d to heat exchanger 25 and upon discharge from the heat exchanger is passed through pipe 74 to fractionation diagrammatically shown at 75. Pipe 71d is regulated by a valve 76 from a liquid level control device 77 on the primary chiller 36. Fractions withdrawn from the neutralization and fractionation steps, diagrammatically shown at 75, have been suitably designated and indicated by arrows 78, 79, 80 and 81.

Figure 2:
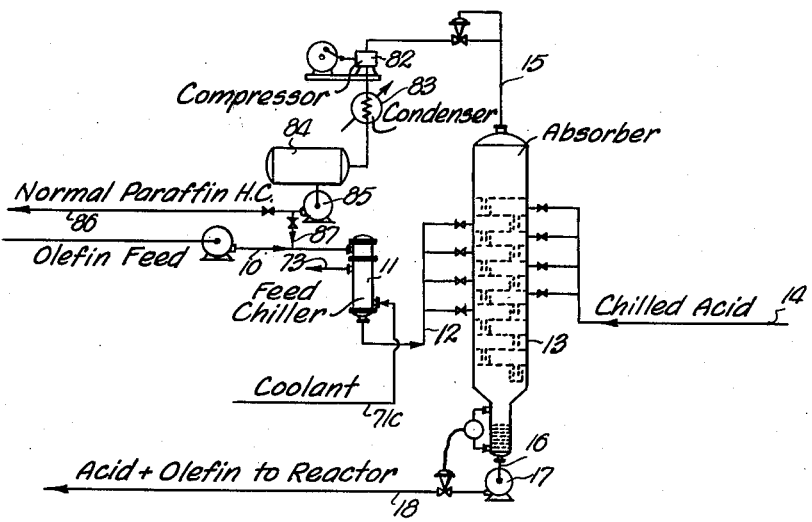
Fig. 2 is a modified type of apparatus adapted to be substituted for that shown within the dot-dash space in the upper left-hand corner of Fig. 1.

The apparatus shown in Fig. 2 under certain conditions is to be substituted for the apparatus enclosed within the dot-dash line in Fig. 1. The procedure utilizing the modified apparatus of Fig. 2 is identical to that explained in connection with Fig. 1 excepting that the olefin feed is discharged into absorber 13 at different levels instead of into the lower portion of the absorber. Also hydrocarbons discharged from the top of the absorber through pipe 15 are compressed at 82, condensed at 83 and accumulated in tank 84. The normal paraffinic hydrocarbons collected in tank 84 are discharged through pump 85 and may be either diverted from the system through pipe 86 or returned through pipe 87 to olefin feed line 10 in order to obtain the refrigerative effect resulting from their revaporization within the absorber.

Figure 3:
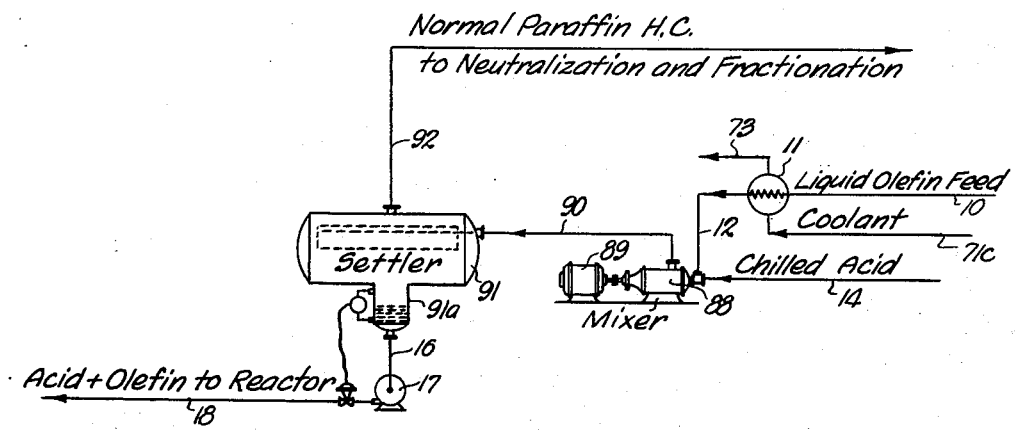
Fig. 3 is a second modification also adapted to be substituted for the apparatus within the dot-dash space in Fig. 1.

When the modified procedure employing apparatus shown in Fig. 3 is substituted for that shown in Fig. 1, the chilled acid and liquid olefin feed are combined in a mixer 88 driven by motor 89 instead of in absorption tower 13. The acid-olefin mixture passes from the mixer through pipe 90 to settler 91 where the acid-olefin phase accumulates in the bottom leg 91a and the normal paraffin is withdrawn from the top through pipe 92. The acid-olefin phase is withdrawn from the settler through pipe 16 and is charged by pump 17 to the reactor through line 18. Flow through line 18 is governed by a valve and liquid level control as in the apparatus shown in Figs. 1 and 2. The hydrocarbon phase removed through line 92 passes to neutralization and fractionation 75.

As previously suggested, applicant's invention involves the stripping of light hydrocarbons such as isobutane and isopentane from the acid leaving the alkylation settler 28 and prior to its introduction into the absorber 13 as well as the recovery of these isoparaffins in both stripper 33 and chiller 36 for return to the alkylation zone.

The process is shown in one of its recommended forms in Fig. 1. When utilizing the procedure there shown, recycle acid leaving the acid settler is passed through a pressure reducing valve 31, actuated in this case by an acid interface level controller into the acid stripper 33. The acid stripper has a tangential inlet into its vapor dome, the stripper containing sloping baffles down which the acid is removed at a relatively slow speed and shallow depth to afford a large vapor release area. A reduced pressure is maintained on the stripper by compressor 49 to effect vaporization of the light hydrocarbons. This vaporization of the hydrocarbons carried with the acid from the settler into the stripper causes a drop in temperature of the acid during its residence in stripper 33. When the settler is operated at 50° F. in the case of butene alkylation and when the acid contains approximately 8% by volume of total hydrocarbons, 5% of which is isobutane and the balance isopentane and other heavier alkylated hydrocarbons, the temperature drop resulting from the vaporization of 5% to 6% of the hydrocarbons is approximately 6° F. to 7° F.

The suction pressure of the compressor 49 required to accomplish this vaporization is considerably below the vapor pressure of isobutane at 43° F. to 44° F. being in the order of 5 to 15 pounds per square inch absolute. In case the absorbed olefins are principally propylene and the settler is operated at 70° F., then an acid containing approximately the same hydrocarbon quantities as given above can be stripped of most of the isobutane at a pressure of about 8 to 22 pounds per square inch absolute. The hydrocarbons stripped from the acid are compressed, condensed and returned to the reactor 19 where they increase the ratio of isoparaffins to olefins in the reactor feed.

As pointed out in my Patent 2,281,248, the absorber must be operated at low temperature for best results, certainly below 50° F. and preferably below 20° F. The acid leaving the stripper 33 is therefore passed to the primary acid chiller 36 which in this example is shown as a pressure vessel containing a closed coil 40 through which the stripped acid is pumped. The hydrocarbon effluent from the settler 28 which consists of alkylate plus excess and recycled isobutane is likewise passed through the primary chiller 36 where it submerges the acid coil 40. This hydrocarbon is subjected to reduced pressure by compressor 52 taking suction on the primary acid chiller and is chilled by the resulting vaporization of light hydrocarbons, principally isobutane. A hydrocarbon effluent from either butylene or propylene alkylation containing between 65% and 80% isobutane can normally be chilled to about 27° F. to 30° F. without going to subatmospheric pressures in the primary chiller and the acid can be chilled to within a few degrees of this temperature. Since the vapors from the primary chiller 36 are compressed, condensed and returned to the composite feed to build up the isobutane-olefin ratio therein, it is desirable to throw as much as possible of the refrigeration duty on the primary acid chiller 36. By going to subatmospheric pressures it is possible to chill the hydrocarbons to lower temperature, for example at an absolute pressure of 7 pounds per square inch absolute, the hydrocarbons in the primary acid chiller can be cooled to temperatures of the order of 0° F. However, at such low temperatures the indirect transfer of heat to the acid in coil 40 is at such a low rate on account of acid viscosity that difficulty is encountered with acid freezing on the walls of the coil or other metallic transfer elements. It is therefore advisable in cases where the acid must be cooled to temperatures lower than say 15° F. to use the indirect heat exchange method with hydrocarbon effluent as the refrigerant only down to said 20° F. and continuing the cooling below this point by other means. It has been found that the final cooling step can be readily accomplished by spraying or otherwise injecting the stripped acid into a body of liquid propane maintained at a temperature only a few degrees under the desired final acid temperature by controlling the pressure on the propane body, as shown at vessel 43. The acid is preferably divided into small droplets near the top of the propane body and allowed to gravitate through an appreciable depth of liquid propane. The acid, being at a higher temperature than the propane, gives up heat by direct contact therewith vaporizing propane as it passes downwardly until it reaches approximately the same temperature as the propane near the bottom of the vessel. Propane vapors are passed off to compressor 55 thereafter being condensed and returned to the liquid propane body in the final acid chilling stage 43. Because there is a very small amount of heavier hydrocarbons in the acid, principally alkylate which was not vaporized in the acid stripper, the propane body in vessel 43 gradually picks up some of this heavier hydrocarbon by solution and a portion of the propane must be either continuously or intermittently withdrawn, passed to the depropanizer tower of the alkylation fractionation section, diagrammatically indicated at 75, where it is purified and then returned to the final acid chiller.

The withdrawn contaminated propane is passed through settler 63 before being sent to fractionation in order to remove acid with which it is mixed in the final chiller. The settled acid, as previously noted, is returned from the bottom of the settler to the chiller while the chilled acid which accumulates in the bottom of the larger vessel 43 contains a very minute percentage of hydrocarbon, principally propane which is not as valuable a product as isobutane nor does it have the detrimental effect of isobutane when introduced into an olefin absorber, as explained hereafter.

If desired the propane body maintained in the final chiller can be indirectly refrigerated by other means such as an ammonia refrigeration system instead of autorefrigeration as shown. In such case the propane vapors would pass off to a condenser cooled by ammonia and the condensate returned to the propane body. It is contemplated also that normal butane or other normal paraffin hydrocarbons may be substituted for propane and maintained at low temperature by continuously circulating a stream of hydrocarbon by means of a pump from the final acid chiller through an ammonia exchanger or other refrigerant and back to the final chiller. It is within the scope of this invention to cool the acid by direct contact with any normal paraffin hydrocarbon which has been cooled by any means.

It is well known in the alkylation art that when olefins, such as propylene or butylene, are mixed with sulfuric acid and isobutane that the isobutane is alkylated by the olefin. When this mixing is done under proper conditions of acid strength, temperature, pressure and proper proportions of reactants, the result is the formation of an alkylated hydrocarbon mixture containing a high proportion (95%–99%) of material boiling in the aviation gasoline range and having a high antiknock rating. It is also well known that the same conditions which promote highest yield and quality of product also result in lowest acid consumption. When any of the proper alkylating conditions are changed, an inferior product results and the acid consumption increases.

A certain amount of alkylation occurs in an olefin absorption step when isobutane is present with the acid. It is well known that alkylation conditions are good and alkylate yield is high only when the ratio of isobutane to olefin in the reaction zone is high and that the alkylate is poor in yield and quality when this ratio is low or where there is more olefin than isobutane. It is also recognized that the acid consumption is high when the isobutane-olefin ratio is too low. When the acid introduced into the olefin absorber is contaminated with a small amount of isobutane, there inevitably takes place a small amount of alkylation governed by the quantity of isobutane present in the acid. The lower the quantity of isobutane the lower is the amount of acid consumed during this parasitic alkylation taking place in the absorber. The best condition to prevail in the absorber would obviously be the complete absence of isobutane and it is this condition which the instant invention seeks to approach. Not only is the isobutane-olefin ratio in the absorber always incorrect for good alkylation but also the temperature which is best for absorption is improper for alkylation. Absorber temperatures should preferably be below 20° F. whereas alkylation temperatures should range between 40° F. and 100° F. depending upon the olefins being alkylated.

*Acid-olefin absorption*

Referring now to the absorption step, there are a number of ways in which this can be accomplished, as shown in the modified structures of Figs. 2 and 3, but in all cases it is desirable to have a minimum amount of isobutane in the acid. Fig. 1 shows an absorber for operation in the vapor phase such as would be preferred when the olefin feed stock is a refinery tail gas containing only a small percentage of propylene or butylene. In such case the quantity of total feed gas is large and the quantity of olefin absorbed is relatively small. The temperature rise on the acid in the absorber would be relatively high of the order of 15° F. to 25° F. occasioned by the fact that not only must the heat of absorption of the olefin be taken up by the acid but the heat of condensation as well, since the olefin enters as a gas and leaves as a liquid. For example, where tail gas contains approximately 5% propylene and 1% butylene and the acid-olefin ratio is 25 to 1, then the temperature rise on the acid in the absorber is approximately 17° F. The lean acid going to the absorber should then be chilled to approximately 0° F. if the maximum temperature in the absorber is to be held under 20° F. It is therefore advisable to utilize the final chiller for cooling the acid through the last 15° F. or more of temperature reduction.

Fig. 2 shows an absorption step particularly adapted for processing a liquid olefin feed stock which will vaporize under the conditions of temperature and pressure maintained in the absorber. Such a feed stock would be a liquid $C_3$ hydrocarbon cut to contain 62% propane, 35% propylene and 3% lighter hydrocarbons. When such a feed stock is introduced as a liquid into the absorber, as shown in Fig. 2, 95% of the olefins can be absorbed with no temperature rise on the acid providing the pressure on the absorber is maintained low enough to allow the propane to vaporize. Greater quantities of propylene can be charged and absorbed without temperature rise on the acid by compressing and condensing the overhead propane and returning a portion of it to the system as required to maintain the desired temperature say 15° F. in the absorber rich acid. With such an arrangement it is unnecessary to employ the final acid chiller shown in Fig. 1 and the acid can be cooled in the primary acid chiller to 15° F. or 20° F. and passed directly from there to the absorber.

Fig. 3 shows an absorption system for operation entirely in the liquid phase and such system is satisfactory for handling either liquid $C_3$ or $C_4$ hydrocarbon fractions containing olefins. Temperature rise in such system, consisting of a mixing device for intimately contacting the chilled acid with the hydrocarbon feed and a settler for separating the unabsorbed hydrocarbons from the rich acid phase, will usually be only 8° F. to 12° F. for acid-olefin ratios of about 25 to 1. It is therefore satisfactory to omit the final acid chiller when using this procedure in some cases although, as pointed out in my previous Patent 2,281,248, it is advantageous to employ lower temperatures particularly when residence time of the acid in the absorption stage is extended. It is possible to achieve shorter residence time of acid in a vapor phase absorption system than in a liquid phase system, but in either case a minimum of rich acid holdup or accumulation should be permitted in the bottom of the absorber or settler, since holding time of rich acid prior to alkylation is detrimental to the product alkylate yield and quality as well as the acid consumption.

Other olefin absorption alkylation processes teach the utilization of effluent from the catalyst hydrocarbon settler as a refrigerant to take away the heat of reaction occurring in the reactor. In such processes the hydrocarbon effluent leaving the settler is chilled by refrigerative evaporation of the lighter hydrocarbons therefrom in indirect heat exchange with the reaction mixture, that is, the heat of reaction is removed as it is generated by evaporation of the chilled effluent. In the instant process, however, the hydrocarbon effluent from the settler is used as a refrigerant primarily for the purpose of chilling acid to prepare it for use in an absorption step. Another distinction between previous processes and those described herein is that heretofore in processes employing effluent refrigeration normal paraffinic hydrocarbons have not been excluded from the system. The presence of these normal paraffinic hydrocarbons in the effluent results in a considerable quantity of normal paraffinic hydrocarbons being evaporated from the effluent along with the isobutane and when this normal hydrocarbon diluent is returned to the reaction zone it has a detrimental effect on the amount of yield and quality of the product and acid consumption. In the instant process the normal paraffinic hydrocarbons such as propane and normal butane are rejected in the absorption step and are not permitted to enter the reaction zone except in extremely small unavoidable quantities which are entrained in the rich acid leaving the absorber. The effluent from the catalyst hydrocarbon settler therefore contains practically no normal paraffinic hydrocarbons and when this effluent is subjected to refrigerative evaporation in the acid chiller the vapors evolved therefrom are predominately isobutane. When this vapor is condensed and returned to the reaction zone it builds up the desirable isobutane-olefin ratio without the detrimental effect of the presence of normal paraffinic hydrocarbons. For example, in a typical alkylation unit without the absorption step but in which hydrocarbon effluent from the settler is used as a refrigerant the vapors separated from the hydrocarbon effluent and passing to compressor 49 and 52 will be composed conservatively of 50% to 60% isobutane, 35% to 45% normal butane and approximately 5% other hydrocarbons represented by lighter fractions of the alkylate. The presence of this 35% to 45% normal butane in the condensate returned to the reaction zone not only does not contribute to the establishment of proper alkylation conditions but actually has a detrimental effect well known to the art. In the instant process the vapors evolved from the hydrocarbon effluent during refrigeration will have a constitution more nearly in the order of 85% to 95% isobutane and 0 to 10% normal butane and 5% heavier hydrocarbons. It is thus readily seen that the evaporative chilling of the hydrocarbon effluent as applied in my process will have an entirely different effect upon the alkylation reaction than the evaporative chilling by hydrocarbon effluent as heretofore applied.

In order to obtain maximum benefit from this hydrocarbon effluent refrigeration it is desirable, as previously mentioned, to throw the maximum portion possible of the refrigeration load upon it. This will involve not only chilling the acid to as low a temperature as conveniently possible without freezing the acid but also utilizing a portion of the chilled effluent as the cooling medium in the reaction, in cases where cooling is required there, which is accomplished by pumping liquid chilled effluent through indirect heat exchange elements in the reaction zone and back to the primary acid chiller, as shown in Fig. 1. It will also involve the use of chilled refrigerant as the cooling medium in the olefin feed chiller 11 whether this olefin feed be gas or liquid.

It has also been discovered that acid esters in the absorption step are extremely unstable and active and it is important that their residence time in the equipment prior to alkylation must be reduced to an absolute minimum for best results. At high acid-olefin ratios more residence time can be tolerated without deterioration of the product although in any case the time should be reduced as much as possible or practical. Residence time as long as one minute has a deleterious effect on yield and quality of product unless acid-olefin ratios in excess of 100 to 1 are employed. However, it is impractical to employ acid-olefin ratios greater than 100 to 1 and for minimum refrigeration requirements, the acid-olefin ratio must be obtained so the temperatures in the absorber and reactor will approximate as nearly as possible those desired. If, for example, the acid is chilled to 16° F. and it is desired to operate the reactor at 50° F. then the acid-olefin ratio (volume ratio) will fall between 40:1 to 50:1. This will result in a temperature of rich acid leaving the absorber of the order of approximately 25° F. to 28° F.

*Alkylation conditions*

In operation of the two-stage absorption alkylation process on pilot plant scale, it has been found that the following conditions will generally hold for best results when alkylating isobutane with either absorbed butylenes or propylenes or a mixture of the two. Maintaining a chilled acid-olefin volumetric ratio to the absorber as high as consistent with the desired temperature in the reactor normally between 20:1 to 100:1, preferably between 25:1 to 50:1. Temperature of the chilled acid introduced into the absorber should be within the range between 0° F. to 30° F., preferably between 5° F. to 20° F., or as low as possible without danger of freezing the acid, since difficulty in handling acid because of high viscosity or solidification is sometimes encountered at temperatures below about 15° F. The temperature of the acid-olefin mixture leaving the absorber should be as low as possible consistent with other operating conditions and is usually limited within a range of 10° F. to 40° F., preferably between 12° F. and 20° F. Residence time of the acid in the absorber should be as short as possible. Practically this time can range between 5 seconds and 60 seconds for vapor phase absorption and preferably less than 20 seconds. For liquid phase absorption and settling the total residence time of the acid in the mixer and settler is of necessity longer than for vapor phase absorption. Mixing and separating can, in such a case, hardly be accomplished in less than a minute even with an extremely low acid level being maintained in the bottom of the settler. Better separation is obtained in longer settling times up to 8 minutes or even longer but the longer the settling time the greater must be the acid-olefin ratio and the lower the temperature in order to compensate for the detrimental effect of the longer holding time.

Alkylate yield and quality go hand in hand and an indication of the quantity of aviation end point gasoline contained in the total alkylate is the percent of alkylate distilled off at 300° F. by ASTM distillation. The curves shown in Fig. 4 indicate the percent alkylate overhead at 300° F. plotted against the function or factor $$\frac{R}{E\sqrt{T}}$$

where:

R is the acid-olefin volumetric ratio in the absorber

E is the temperature of the rich acid leaving the absorber in degrees F minus 16

T is the residence time of acid in the absorption step plus the time during which it is in transit from the absorber to the reactor expressed in minutes.

Figure 4:
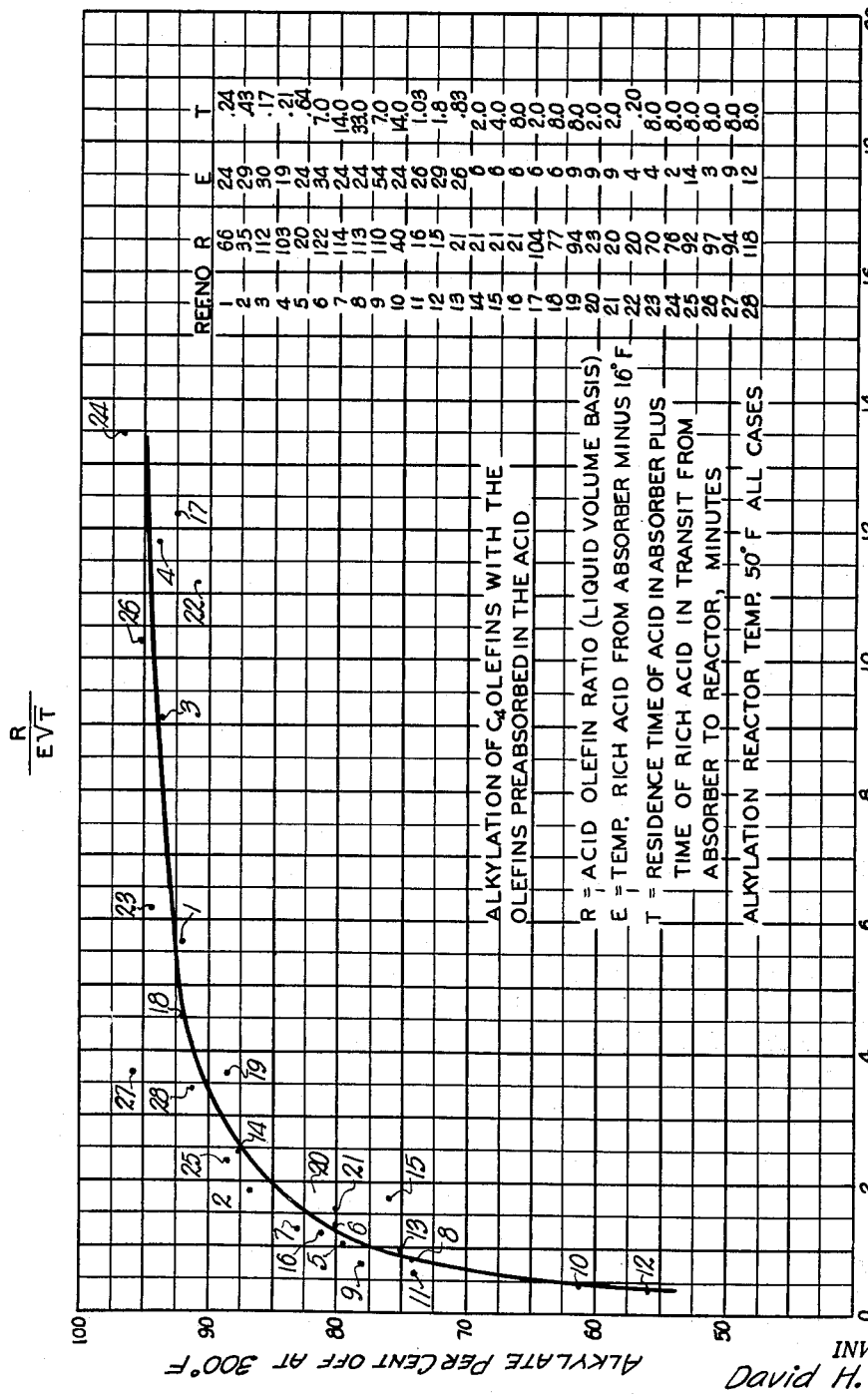
Fig. 4 shows a curve developed by charting points according to factor $$\frac{R}{E\sqrt{T}}$$

In Fig. 4 is a tabulation of 28 tests by which the points were established from which the curve was developed. The reactor temperature during these tests was in all cases held at 50° F. Anything which is done in the operation of the unit to increase the value of factor $$\frac{R}{E\sqrt{T}}$$

will improve the quality of the alkylate. However, there are practical limitations on all of the components entering into this formula and moreover a heat balance must be maintained on the unit so that the quantity of chilled acid circulated will result in a proper reactor temperature. Novelty and originality is claimed herein to the development of the relation which exists between acid-olefin ratio, time and temperature and the compensating effects of one for the other in the establishment of proper conditions for manufacturing high quality alkylate.

Having thus described my invention, I claim:

1. A process of alkylating isoparaffinic hydrocarbons and olefins with a catalyst of the sulfuric acid type comprising the steps of contacting the isoparaffins and olefins in the presence of said catalyst in a reaction step, separating the reaction mixture in a separating step maintained at pressures sufficient to keep the hydrocarbons in liquid phase into a liquid catalyst phase and a hydrocarbon phase, simultaneously cooling the acid catalyst and vaporizing hydrocarbons from the catalyst phase in a stripping step operated at pressures below those of the separating step, further cooling the stripped catalyst and passing said catalyst to an absorption step and there contacting it with an olefin-bearing feed stock, and recycling the acid catalyst with the absorbed olefins to the reaction step.

2. A process as in claim 1 in which the hydrocarbon phase from the separating step is subjected to autorefrigerative cooling in indirect heat exchange with the stripped catalyst.

3. A process as in claim 1 in which the hydrocarbon phase from the separating step is subjected to autorefrigerative cooling in indirect heat exchange with the stripped catalyst and isoparaffinic hydrocarbon vapors from the autorefrigerative cooling are condensed and recycled to the feed to the reaction step.

4. In a process of alkylating isoparaffinic hydrocarbons and olefinic hydrocarbons with a catalyst of the sulfuric acid type, wherein the olefinic hydrocarbons are absorbed in the acid catalyst and the absorbed olefinic hydrocarbons are thereafter used to alkylate the isoparaffinic hydrocarbons, the improvement comprising the steps of separating the acid and hydrocarbons recovered as effluent from the alkylation step, chilling the acid and contacting it with the olefinic hydrocarbons under conditions defined by the factor $$\frac{R}{E\sqrt{T}}$$

and where said factor has a numerical value greater than 2, R being the acid to olefin ratio (liquid volume basis), E the temperature in degrees Fahrenheit above 16° F. of the acid olefin mixture leaving the absorption step, and T is the residence time of the acid in the absorption step including the time in transit from the absorber to the alkylation step in minutes.

DAVID H. PUTNEY.

References Cited in the file of this patent

UNITED STATES PATENTS

| Number | Name | Date |
|---|---|---|
| 2,334,861 | Bowles | Nov. 23, 1943 |
| 2,347,999 | Elliott et al. | May 2, 1944 |
| 2,349,415 | Draeger et al. | May 23, 1944 |
| 2,370,771 | Bowerman | Mar. 6, 1945 |
| 2,389,604 | Dowding | Nov. 27, 1945 |
| 2,488,943 | Shearer | Nov. 22, 1949 |

FOREIGN PATENTS

| Number | Country | Date |
|---|---|---|
| 538,307 | Great Britain | July 29, 1941 |